United States Patent
Chambers et al.

(10) Patent No.: US 9,977,880 B2
(45) Date of Patent: May 22, 2018

(54) SYSTEMS AND METHODS FOR ENFORCING SOFTWARE LICENSE COMPLIANCE WITH VIRTUAL MACHINES

(71) Applicant: VMware, Inc., Palo Alto, CA (US)

(72) Inventors: Benjamin A. Chambers, San Francisco, CA (US); Matthew David Ginzton, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 592 days.

(21) Appl. No.: 14/517,264

(22) Filed: Oct. 17, 2014

(65) Prior Publication Data

US 2015/0040182 A1  Feb. 5, 2015

Related U.S. Application Data

(62) Division of application No. 12/122,582, filed on May 16, 2008, now Pat. No. 8,875,266.

(60) Provisional application No. 60/938,387, filed on May 16, 2007.

(51) Int. Cl.
| | |
|---|---|
| *G06F 21/12* | (2013.01) |
| *G06F 21/44* | (2013.01) |
| *G06F 21/10* | (2013.01) |
| *G06F 9/455* | (2018.01) |

(52) U.S. Cl.
CPC ........ *G06F 21/121* (2013.01); *G06F 9/45533* (2013.01); *G06F 21/10* (2013.01); *G06F 21/44* (2013.01); *G06F 9/45558* (2013.01); *G06F 2009/45587* (2013.01); *G06F 2221/0746* (2013.01)

(58) Field of Classification Search
None
See application file for complete search history.

(56) References Cited

U.S. PATENT DOCUMENTS

| | | | | |
|---|---|---|---|---|
| 2002/0183056 | A1* | 12/2002 | Lundblade | H04W 74/006 455/424 |
| 2004/0193394 | A1* | 9/2004 | Levit-Gurevich | G06F 9/45537 703/22 |
| 2005/0273856 | A1* | 12/2005 | Huddleston | G06F 21/53 726/22 |
| 2006/0136912 | A1* | 6/2006 | Robinson | G06F 21/53 718/1 |
| 2007/0089111 | A1* | 4/2007 | Robinson | G06F 21/53 718/1 |

(Continued)

*Primary Examiner* — Amir Mehrmanesh

(57) ABSTRACT

A virtualization system supports secure, controlled execution of application programs within virtual machines. The virtual machine encapsulates a virtual hardware platform and guest operating system executable with respect to the virtual hardware platform to provide a program execution space within the virtual machine. An application program, requiring license control data to enable execution of the application program, is provided within the program execution space for execution within the virtual machine. A data store providing storage of encrypted policy control information and the license control data is provided external to the virtual machine. The data store is accessed through a virtualization system including a policy controller that is selectively responsive to a request received from the virtual machine to retrieve the license control data dependent on an evaluation of the encrypted policy control information.

13 Claims, 7 Drawing Sheets

(56) References Cited

U.S. PATENT DOCUMENTS

2008/0098465 A1\* 4/2008 Ramakrishna .......... G06F 21/10
726/5
2008/0163210 A1\* 7/2008 Bowman ............... G06F 9/4843
718/1

\* cited by examiner

SYSTEMS AND METHODS FOR ENFORCING SOFTWARE LICENSE COMPLIANCE WITH VIRTUAL MACHINES

CROSS-REFERENCE TO RELATED APPLICATIONS

This application is a divisional application of application Ser. No. 12/122,582, filed May 16, 2008, which claims the benefit of Provisional Patent Application 60/938,387, filed May 16, 2007, the contents of which is hereby expressly incorporated by reference in its entirety.

BACKGROUND OF THE INVENTION

The many automation-based techniques for implementing and enforcing software license requirements, specifically the permissions, rights and restrictions under which a particular program or software package can be used, have achieved varying degrees of success over the years. Beyond the purely commercial interest of ensuring compensation for access to software, there are additional interests in controlling the concurrent use of defined instances, the available or active feature sets, the restricting of software to particularly identified system hardware or computer platforms, and rights to further distribute software under different categories of licensing. Interest in controlling use is not, however, limited to software vendors. System managers, especially in controlled, secure environments, may wish to actively control and ensure that only specifically licensed software is permitted to be executed or that particular software is executable on particular systems by individuals or groups with necessary permissions.

Conventional automation based licensing strategies include use of self-certifying software modules, other software modules that rely on some inherent system or platform identifier, and dongles and other hardware based add-in components. In each case, a challenge-response transaction is typically implemented to validate the application is licensed for the requested use. Self-certifying software modules typically implement an encryption-based license control algorithm to securely verify a user provided license code against an embedded, encrypted value or transform function uniquely associated with a software package instance. To prevent spoofing circumvention, the license control algorithm can be made additionally reliant on a platform identifier. Conventionally, a platform identifier is a specific processor-resident hardware value or generated as a bit-code representative of the combined identity of platform hardware further tracked against a remote license database.

Alternately, a unique encrypted identifier or encryption transform function, against which a specific software package instance is licensed, can be provided through a proprietary hardware dongle attached to an available system port or, equivalently, an expansion card on a peripheral bus. To reduce the potential for circumvention, a significant portion of the license control algorithm can be implemented on the dongle as part of the transform function. Conventionally, a software package reliant on a hardware dangle is constructed to frequently require access to and validation of continued operation from the dongle, rendering impractical circumvention by selectively nullifying all code points within the software package that rely on dongle access.

These conventional licensing strategies become particularly complicated, if not rendered fundamentally impractical, where the computer system platform used to execute the licensed software is implemented using virtual machine technologies. Virtualization decouples the application software from the underlying hardware platform. Consequently, the license control algorithms implemented by application programs cannot discern changes in the underlying hardware platform, allowing the application program, including virtual computer environment, to be copied and executed without imposed limit. Decoupling also defeats the ability of the application program to discern whether a hardware dongle is uniquely available to just one application instance or, through virtual connections, shared by many.

Aside from the licensing issues, however, the benefits of virtual machines for the execution of conventional software applications are compelling and well recognized. Virtual machine technology enables multiple, relatively independent virtual machines to be executed on a single host platform. Each virtual machine encapsulates a guest operating system that, as between different virtual machine instances, may be of different type and revision. Each guest operating system, in turn, manages a discrete application execution space. Virtual machine technology thus enables more efficient use of hardware capacity, while still ensuring that the users of the different virtual machines have access and use of a "complete" computer. Depending on specific implementation, virtualization can and typically does ensure security as between the applications executed in different virtual machines even as executed on the same physical machine. The virtualization of the underlying computer system isolates potentially unstable or unsafe software from adversely affecting the hardware state or system files required for running the physical (as opposed to virtual) hardware.

As is well known in the field of computer science, a virtual machine (VM) is an abstraction—"virtualization"—of an actual physical computer system. FIG. 1 shows one possible arrangement of a computer system 10 that implements virtualization. One or more virtual machines (VMs) or "guests" 12, $12_N$ are installed on a "host platform," or simply "host," which will include system hardware 14, also referred to herein as a hardware platform, and virtualization software 15. Virtualization software 15 may comprise one or more layers or co-resident components comprising system-level software, such as a kernel 16, and a virtual machine monitor 18, $18_N$, or some combination of these. The system hardware 14 typically includes one or more processors 20, memory 22, some form of mass storage 24, and various other devices 26. The configuration of virtualization software shown in FIG. 1 is referred to as an "unhosted" virtualization system because the kernel 16 takes the place of a host operating system. Virtualization software could also provide a hosted configuration in which a host operating system (not shown) is co-resident with a hypervisor or virtual machine monitor.

Each VM 12 will typically have both virtual system hardware 28 and guest system software 30. The virtual system hardware typically includes at least one virtual CPU 32, virtual memory 34, at least one virtual disk 36, and one or more virtual devices 38. Note that a disk—virtual or physical—is also a "device," but is usually considered separately because of the important role of the disk. All of the virtual hardware components of the VM may be implemented by virtualization software 15 using known techniques to emulate the corresponding physical components. Thus, the virtual system hardware 28 does not exist as software or hardware components within virtual machine 12, however, the states of these virtual devices are generally considered to be part of virtual machine 12. Furthermore, virtual system hardware 28, illustrated as being "within"

virtual machine 12, provides a convenient representation of the execution environment of guest system software 30. Guest system software 30 includes a guest operating system (OS) 40 and drivers 42 as needed for the various virtual devices 38. Guest system software 30 generally will include applications (not shown) that execute in an application execution environment provided by guest OS 40 and virtual system hardware 28.

Note that a single VM may be configured with more than one virtualized processor. To permit computer systems to scale to larger numbers of concurrent threads, systems with multiple CPUs have been developed. These symmetric multi-processor (SMP) systems are available as extensions of the PC platform and from other vendors. Essentially, an SMP system is a hardware platform that connects multiple processors to a shared main memory and shared I/O devices. Virtual machines may also be configured as SMP VMs. FIG. 1, for example, illustrates multiple virtual processors $32_{0-M}$ (VCPU0, VCPU1, . . . , VCPUm) within the VM 200.

Yet another configuration is found in a so-called "multi-core" architecture, in which more than one physical CPU is fabricated on a single chip, with its own set of functional units (such as a floating-point unit and an arithmetic/logic unit ALU), and can execute threads independently; multi-core processors typically share only very limited resources, such as some cache. Still another technique that provides for simultaneous execution of multiple threads is referred to as "simultaneous multi-threading," in which more than one logical CPU (hardware thread) operates simultaneously on a single chip, but in which the logical CPUs flexibly share some resource such as caches, buffers, functional units, etc. The terms, "CPU" or "processor" as used herein, should be understood to encompass any of these processor configurations.

If VM 12 is properly designed, applications 44 running on the VM will function as they would if run on a "real" computer, even though the applications are running at least partially indirectly, that is via the guest OS 42 and virtual processor(s). Executable files will be accessed by the guest OS from the virtual disk 36 or virtual memory 34, which will be mapped to portions of physical disk 24 or memory 22 that are allocated to that VM. Once an application is installed within the VM, the guest OS retrieves files from the virtual disk just as if the files had been pre-stored as the result of a conventional installation of the application. The design and operation of virtual machines are well known in the field of computer science.

As mentioned above, virtualization software 15 is an interface that is logically interposed between guest system software 30 within VM 12 and the various hardware components and devices in the underlying hardware platform. The term, "hypervisor" is often used to describe both a VMM 18 and a kernel 16 together, either as separate but cooperating components or with one or more VMMs incorporated wholly or partially into the kernel itself. However, "hypervisor" is sometimes used instead to mean some variant of a VMM alone, which interfaces with some other software layer(s) or component(s) to support the virtualization. In some systems, some virtualization code is included in at least one "superior" VM to facilitate the operations of other VMs. Furthermore, specific software support for VMs may be included in the host OS itself.

Certain software components illustrated are shown and described as being within a virtualization software 15 located logically between virtual machines 12 and the system hardware 14. However, it is possible to implement at least part of virtualization software 15 within specialized hardware (not shown). Therefore, the illustrated embodiments are given only for the sake of simplicity and clarity and by way of illustration—as mentioned above, the distinctions between various components of a virtualized platform are not always so clear-cut. Unless otherwise indicated, the terms, "virtual," "virtualize," "virtualization," etc., refer herein to virtualized computer systems having any type or configuration of virtualization software.

The various virtualized hardware components in the VM, such as virtual CPU(s) 32, virtual memory 34, virtual disk 36, and virtual device(s) 38, are shown as being part of the VM 12 for the sake of conceptual simplicity. In actuality, these "components" are usually implemented as software emulations 46 included in the VMMs $18_{1-N}$. One advantage of such an arrangement is that the VMM may (but need not) be set up to expose "generic" devices, which facilitate VM migration and hardware platform-independence.

The availability of virtualization software has posed challenges to developers concerned about piracy of their products. In particular, a self-certifying module will be unable to distinguish unique virtualized platform instances, at least not without substantial additional, and typically complex, virtualization platform specific coding. Conversely, where a unique platform instance can be discerned, the characterizing platform details are represented by the virtualized rather than underlying physical platform. Therefore, self-certifying modules may certify in all copies of the virtual machine.

Virtualization can also limit the effective use of hardware dongles. In effect, all virtual machines implemented on host platform may nominally have unconstrained access to a particular dongle, thereby allowing application instances to run equally licensed in each of the hosted virtual machines. The different virtual machines can, of course, be distinctly configured to define which have access to a particular port and, thereby, an attached dongle. Beyond the potential for circumvention of copy protections schemes by system administrator modification of the configuration files, the specific restriction of licensed virtual machines to a particular hardware dongle significantly constrains other intrinsic benefits of virtualization. For example, virtualization enables ready movement of virtual machines to different platforms to provide automated load scaling and redundancy in case of physical hardware failures. Constraint to a particular hardware platform due to a physical dongle requirement is undesirable, particularly where direct manual management intervention is intrinsically required to preserve the scaling and redundancy capabilities of virtualization.

SUMMARY

In one embodiment, a method for enforcing licensing permissions, rights and restrictions is securely controlling the execution of a computer system program within a virtual machine. The virtual machine may provide an execution environment for a guest operating system and at least one computer program configured to execute in conjunction with the guest operating system. The virtual machine may be configured for execution by way of system level virtualization software on a current host platform, the current host platform comprising at least one central processing unit having access to mass storage device. In the method, a secure policy controller is executed outside of the virtual machine. The secure policy controller may access policies stored by the mass storage device, the policies identifying one or more hardware platforms for which the virtual machine is authorized to execute. The secure policy controller may determine whether the host platform matches one of the hardware platforms identified by the policies and prohibit the virtual machine from executing on the current host platform when the policies do indicate that the virtual machine is permitted to execute on the current host platform; and permit the virtual machine to execute on the current host platform when the policies indicate that the virtual machine is permitted to execute on the current host platform.

DETAILED DESCRIPTION OF THE INVENTION

As will become clear in the following description of an exemplary licensing enforcement framework, implementation of the present invention is not closely dependent on any particular implementation of the physical computer system or, in general, the particular architecture of the virtual machine and supporting virtualization technology. As will become apparent, the exemplary framework described below is not constrained to servicing any particular type of software program, but rather is applicable to any software program otherwise supported by the guest operating system, including or in the alternative, the guest operating system itself, that requires access to external license control data. A person of ordinary skill in the art will, accordingly, readily recognize from the following discussion the variety of computer systems, virtual machines and virtualization techniques, and programs to which the present invention is applicable.

Figure 1:
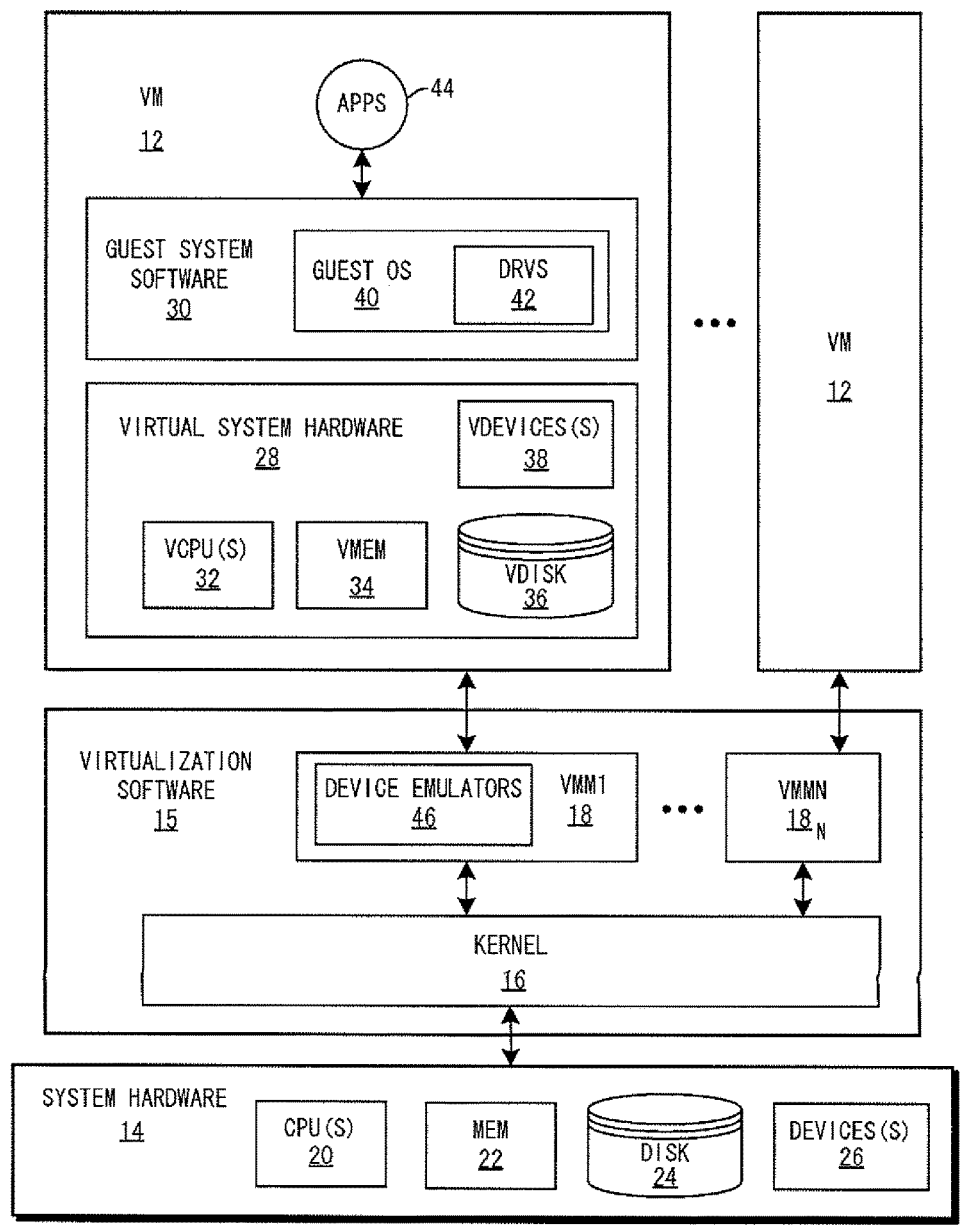
FIG. 1 illustrates the main components of a generalized virtual computer system.
Figure 2:
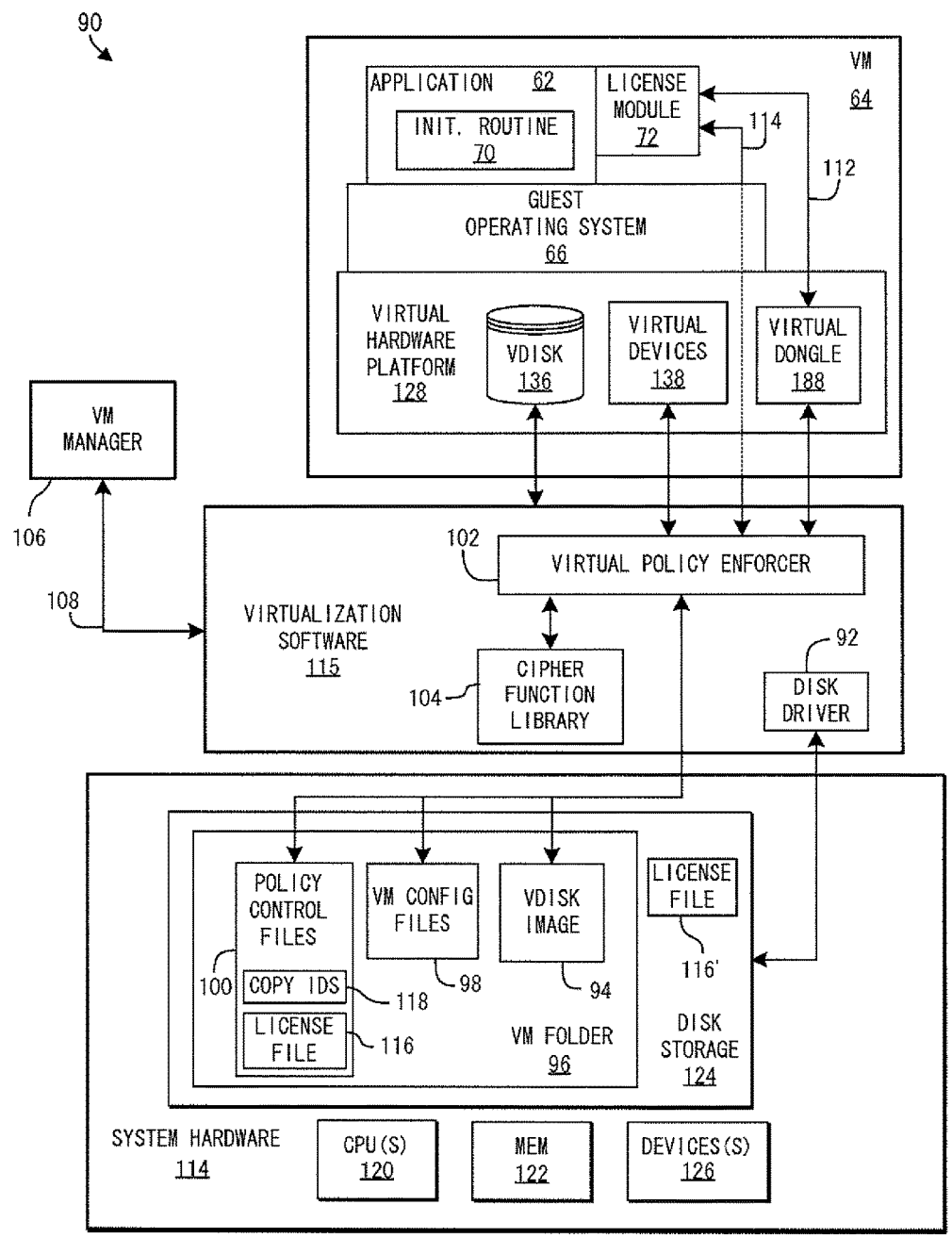
FIG. 2 provides a block diagram of a computer system supporting a license controlled virtual machine.

FIG. 2 shows a block diagram showing by way of example a license verification framework implanted in a virtualized computer system 90. Uniquely instanced license control over the application programs 62 is ensured by a two-fold association of the applications 62 with virtual machine 64 and of virtual machine 64 with the unique underlying hardware platform 114. This association is established, in one embodiment, through use of secure and persistently stored access control policies and license data that define the acceptable use of both the encapsulating virtual machine and the application programs 62.

For example, in one embodiment, license module 72 is implemented as a relatively thin software library that enables an initialization routine 70 to functionally interoperate with and through the virtual machine 64 to authenticate license keys and retrieve license information. Initialization routine 70 is executed when application 62 is launched and functions to evaluate license control information to determine whether continued execution of application program 62 is permitted and, if so, the licensed set of programmatic features and functions enabled for the particular instance of application program 62.

In one embodiment, license module 72 is provided as a software component linked to application program 62. In alternate embodiments, license module 72 may be incorporated into initialization routine 70 of application program 62 or fully dissociated from application program 62 as an independent program executed by guest operating system 66 or made virtually available to initialization routine 70 by virtual machine 64. Therefore, use of the secure access control policies may be made transparent to the application programs 62, which may therefore be conventional in nature. The license module 72 is, in each case, responsible for accessing a communications channel to and through the virtual machine 64 to obtain the license control information. For purposes of discussion, this access channel is described as a "virtual dongle" for which it is loosely analogous as functionally enabling the retrieval of license control information by the license module 72.

Virtual machine 64 encapsulates the virtual computer hardware platform 128, including virtual disk devices 136 and other supported virtual devices 138, including virtual system I/O ports. License module 72 is linked with application program 62, which in turn is supported by guest operating system 66. File system accesses to data by application program 62, as well as guest operating system 66, are directed to the virtual disk 136. These access requests are relayed through and, as appropriate, translated, by the virtualization software 115 to corresponding accesses of the physical disk storage 124, e.g., by way of a disk driver 92. Specifically, access requests directed to the virtual disk 136 are preferably realized as access requests directed to virtual disk image 94 stored within virtual machine folder 96 physically present within a directory maintained on the physical disk storage 124. In one embodiment, virtual disk image 94 contains a complete file system in functional emulation of a conventional (i.e., physical) disk drive storage device. Virtual machine folder 96 may be organized as a directory that, in turn, contains virtual disk image 94 in combination with virtual machine configuration files 98 and virtual machine policy control files 100. In general, virtual machine configuration files 98 store the information used to define the configuration of virtual machine 64. Policy control files 100 are used to store information defining access and operating controls on the operation of the virtual machine.

In one embodiment, virtual machine folder 96, which stores virtual machine policy and configuration files 98, 100, as well as virtual disk image 94 defined for the virtual machine 64, is an encrypted storage container. Virtualization software 115 may implement a virtual policy enforcer layer 102 that controls access to encrypted virtual machine folder 96 dependent on the access control policies maintained within the policy control files 100. Operation of virtual policy enforcer layer 102 may be supported by a cipher function library 104 that implements encryption algorithms appropriate to support both data encryption and secure authentication. Thus, access to the virtual machine folder 96 is secured by and requires use of the virtual policy enforcer layer 102.

Administration of virtual disk image 94 of the virtual machine 64 and related aspects of the virtualization system 90 may be performed through VM manager 106, which may be an administrative virtual machine management server acting through the virtualization software 115 and, ultimately, the kernel resident disk device driver 92. VM manager 106 may communicate with virtualization software 115 via a network connection 108 or other means. Administration of the contents of the encrypted virtual machine folder 96, including in particular the virtual machine configuration files 98 and policy control files 100, may also be performed using VM manager 106. As indicated, administration of the virtual machine folder 96 is subject to the virtual policy enforcer layer 102 further acting through the disk device driver 92 to securely access the contents of the virtual machine folder 96. In accordance with the present invention, administration of virtual machine folder 96 includes enabling editing of the individual virtual machine configuration files 98 and policy control files 100 as well as the selective application of patch updates, by which pre-configured differential content updates can be concurrently applied to any or all of the files stored within the virtual machine folder 96, including virtual disk image 94.

In one embodiment, license module 72 implements first and/or second access paths 112, 114 to license files functionally stored external to the virtual machine 64. For example, license files 116 may be stored within the virtual machine folder 96 as entries in or as referenced from the policy control files 100. Alternately, policy control files 100 may reference or define the applicable access controls that will allow access from virtual machine 64 to license files 116' stored externally of virtual machine folder 96, e.g., on local physical disk store 124, other local disk stores (not shown), or the storage systems provided by other computer systems (not shown).

First access path 112, ultimately reaching the virtual machine folder 96 to access the policy control files 100 and license files 116, 116', may be implemented through an application programming interface (API) provided by virtual computer system platform 128. For purposes of representation, this interface is shown as presented by virtual dongle 188. In one embodiment, virtual dongle 188 may not ordinarily be accessible by or through the guest operating system 66. License authentication and control information requests are passed by the virtual dangle 188 to the virtual policy enforcer layer 102 using ordinary hardware device virtualization techniques. As mentioned previously virtual hardware devices are implemented by emulators that form part of virtualization software 115 which are in communication with device drivers implemented in guest operating system 66. For example, Virtual Dangle 188 is implemented as a unique hardware device for which a special driver is installed into guest OS 66. It is also possible for virtual dangle 188 to be implemented through an assigned port of the virtual devices 138 and the virtual policy enforcer layer 102. Since the virtual devices 138 are nominally available to the guest operating system 66, coordinated, if not dedicated use of a virtual port may be established to enable access to virtual policy enforcer 102. Thus, application 62 initiated requests for license information may then be passed through the license module 72 and an assigned port, such as a Universal Serial Bus (USB) port in communication with USB drivers built into guest operating system 66. Virtual dongle 188 may be similarly implemented as a device on a different standard I/O port such as a network port, PCI, SCSI, etc. Communication with the assigned port may be recognized and processed by the virtual policy enforcer layer 102. Regardless of the implementation, license module 72 may be configured to communicate with virtual policy enforcer layer 102 by way of a virtual dangle which appears as a hardware device within VM 64.

This allows the license module 72 to identify the application 62 to the virtual policy enforcer layer 102 and, as permitted by the access restrictions defined by the policy control files 100, to selectively return the contents of the license files 116, 116' to the application 62. In one embodiment, the license module 72 may additionally present a well-defined API through which the application 62 can iteratively or otherwise perform ad hoc queries for specific information defining different licensable features from the contents of the license files 116, 116'. For example, application 62 may issue a query to determine whether particular features of the software is paid for, and adjust its behavior accordingly. The back end for the virtual dongle can satisfy these queries a number of ways, e.g, by looking at metadata that is included with the virtual machine, or by querying $3^{rd}$ party licensing libraries or licensing servers.

In another embodiment, access path 114 to the policy control files 100 and license files 116, 116' can be established using what is referred to herein as a "hypervisor call" or simply a "hypercall." A hypercall is a special function that allows software modules, such as license module 172 to communicate with the virtualization software 115 through a bridge component (not shown) which may itself be implemented in virtualization software 115. For example, license module 72 may place information into one or more registers or into a specified guest physical memory location and then execute an instruction or series of instructions that are recognized by the hypervisor. Those skilled in computer virtualization should be familiar with hypercalls.

Use of the interface presented by virtual dongle 188 provides certain advantages. First, much of the functionality required to be implemented in license module 72 can be instead be uniquely implemented in the software module, driver, or modules that collectively implement virtual dongle 188, thereby reducing the required content and complexity of license module 72. This, in turn, reduces the required variants for license module 72 required to support different application programs 62. Additionally, virtual dongle component 188 can be replaced or updated to address newly identified security concerns or handle changes otherwise made to virtual machine 64 or virtualization system 90 independent of application 62. This also functionally separates virtual dongle 188 from other virtualized components 136, 138 of the virtual hardware platform 128, thereby effectively hiding virtual dongle 188 from guest operating system 66 and other potentially insecure applications executed by operating system 66. In one embodiment, virtual dongle 188 may be accessed inconspicuously by license module 72 writing to invalid I/O ports, at least from the perspective of the guest operating system 66.

Figure 3:
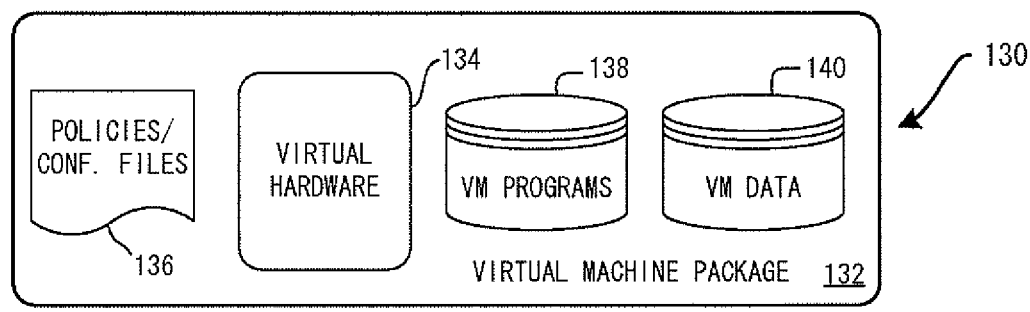
FIG. 3 is a simplified block diagram of a packaged virtual machine suitable for distribution.

In one embodiment, application 62 may be packaged with a virtual machine. As generally illustrated in FIG. 3, a virtual machine package 132, also referred to as a para-application package, provides an execution environment containing one or more different applications. That is, the virtual machine package contains a pre-configured instance of the virtual hardware 134 that, on execution, implements a virtual hardware platform and related aspects of a virtual machine. Manifest files 136, including the virtual machine configuration files 98 and policy control files 100 (FIG. 2) provide the initialization and execution control information. Virtual disks 138, 140 generally correspond to the virtual disk image 94. First virtual disk 138 stores the executable virtual machine programs, including the application 62, guest operating system 66, described above with reference to FIG. 2, and other user environment application and utility programs. User and application data may be stored separately on second virtual disk 140 to simplify subsequent patch updates of the executable programs stored on the first virtual disk 138 without compromising the integrity of user data.

Distribution of the application 62 in virtual machine packages 132, in accordance with the present invention, enables secure control over the replication of the embodied virtual machine and, correspondingly, the application 62 contained within. Preferably, virtual machine packages 132 are cryptographically signed. Specifically, a secure signature of the manifest and other defined read-only components of the virtual machine package 132 may be verified by virtualization system 90 each time virtual machine 64 is launched. A copy control list 118 (FIG. 2) is preferably embedded within the policy control files 100 to store identifiers used to control derivative distribution of application 62. In one embodiment, a suitable identifier of each allowed, or licensed, virtualization system 90 is stored in the copy control list 118.

Copy control list 118 need not be static. In one embodiment, copy control list 118 may be dynamically modified subject to access controls and modification restrictions defined by the policy control files. For example, policy allowed patch updates of the policy control files 100 can replace the identification of the host platform 114 allowed to execute instances of the virtual machine 64, thereby allowing the virtual machine 64 to be moved to a different host platform 114. Where licensing is intended to allow alternate execution on any of a set of host platforms 114, copy control list 118 may be updated with identifications of the allowed set and, as necessary, security certificates for package 132 on each licensed host platform 114.

Figure 4:
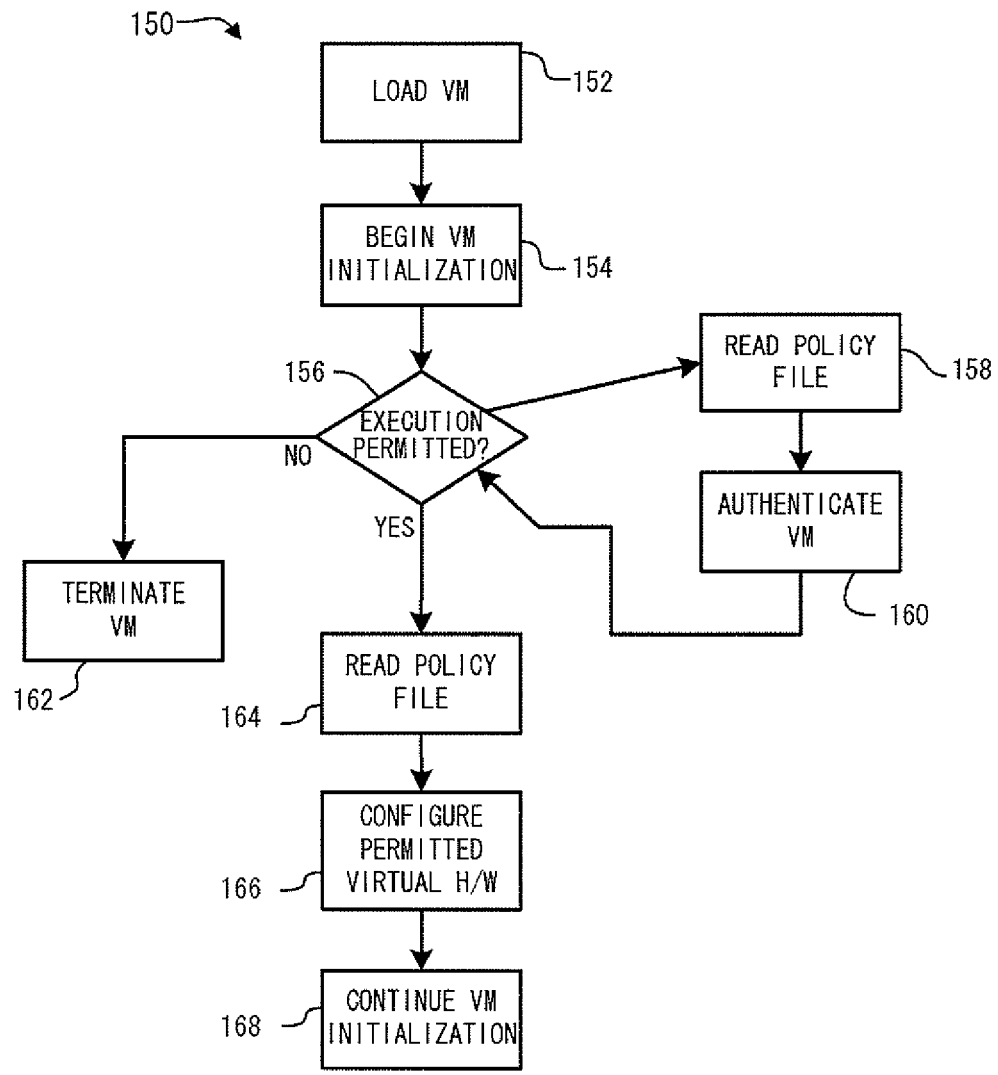
FIG. 4 shows a flowchart illustrating by way of example a method of establishing secure execution of a virtual machine.

FIG. 4 shows a flowchart 150 illustrating an exemplary process for establishing an initial secure execution of virtual machine 64. In operation 152, a VM is, at some point, loaded onto a physical host platform. Following the loading operation, operation 154 is carried out wherein execution begins with the initialization of the virtual machine 64. Pending configuration, physical devices 136, 138 of the virtualized hardware platform 128 are functionally disabled. This default locked configuration precludes any operation by the application 62 or guest operating system 66 that could potentially permit circumvention of the license control measures provided by the present invention.

Once the virtual machine 64 is sufficiently initialized to permit interaction with the virtual policy enforcer layer 102, the procedure flows to operation 156, wherein a component of virtualization software 115, e.g., the virtual machine monitor, queries virtual policy enforcer layer 102 to determine whether continued execution of virtual machine 64 is permitted on the host platform 114. In response, virtual policy control layer 102 performs operations 158, 160 wherein policy control files 100 are accessed virtual machine 64 is authenticated against the host platform 114. In one embodiment, this authentication includes deriving a platform identifier from one or more components of the host platform 114 hardware, and then cryptographically authenticating this identifier against a license value stored as part of the policy control files 100. If authentication fails, virtual policy control layer 102 returns an indication of authentication failure to virtualization software 115 which then terminates further execution of virtual machine 64 in operation 162.

Figure 5:
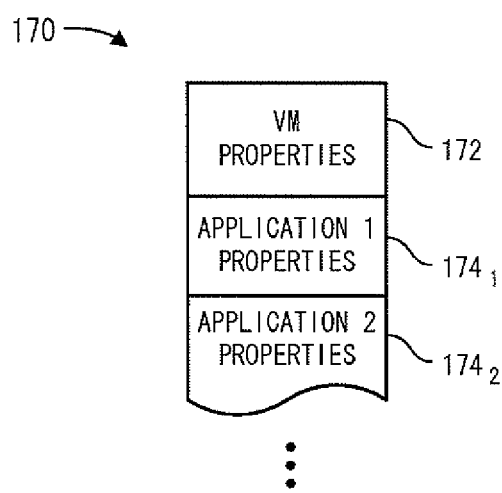
FIG. 5 is a block diagram representing the collected policy based properties that define the available features of a virtual machine and one or more application programs encapsulated within the virtual machine.

If execution is determined to be permitted in operation 156, then the procedure flows to operation 164 wherein policy control files 100 are read to identify configuration parameters for the virtual machine 64. In one embodiment, policy control files 100 store one or more properties files 170, as represented in FIG. 5, that define the operating parameters of the virtual machine 64 and application 62. The set of virtual machine properties 172 may define a subset of virtual components 136, 138 that may be enabled and, further, any functional constraints that are to be placed on operation of the components 136, 138. For example, guest operating system 66 or any application 62 may be prohibited from modifying the operative configuration of components 136, 138 regardless of the privilege level within which such a modification is attempted. Application property sets $174_{1-N}$ are preferably provided to respectively define an operating configuration of a plurality of application programs 62. For example, properties $174_X$ for a particular application program 62 may describe, directly or by reference, a preferred base configuration of the application program 62 and, as applicable, the associated license rights 116, 116' (FIG. 2).

In operation 166, virtual machine properties 172 are evaluated in combination with virtual machine configuration files 98 to appropriately enable and further configure the virtual components 136, 138. Individual virtual peripheral devices 138, such as network interface controllers and printer interface ports (not shown separately) may be selectively enabled dependent on corresponding virtual machine property values 172. Then in operation 168, virtual machine 64 continues initialization, including initial execution of the guest operating system 66.

Figure 6:
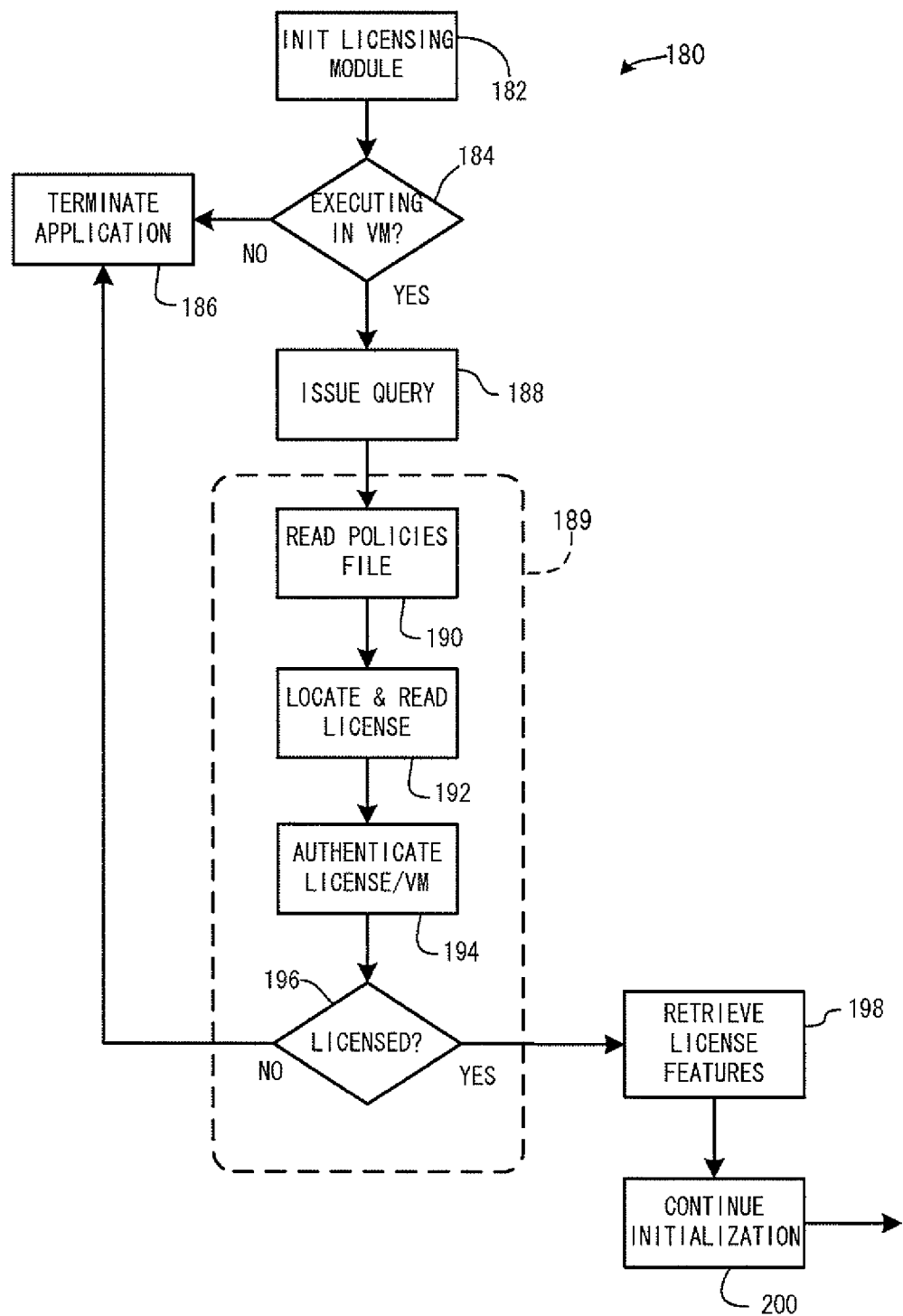
FIG. 6 shows a flow chart illustrating by way of example a method of establishing secure and licensed feature controlled execution of an application program.

FIG. 6 shows a flowchart 180 showing by way of example a process for secure and licensed feature controlled execution of application programs 62. This process may be performed after a guest virtual machine has completed initialization as described above with reference to FIG. 4. As described above, application program 62 having initialization routine 70 may be loaded for execution from virtual disk image 94. Initialization routine 70 may call licensing module 72 which may initialize in operation 182. In operation 184, licensing module 72 may verify that application 62 is executing in a virtual machine of a type compatible with use of licensing module 72. For example, identification of a compatible virtual machine may be determined by performing a virtual machine specific operation. In one embodiment, this operation can be combined with operation 188 querying a virtual dongle may fail when licensing module is not executing within a VM.

Figure 7:
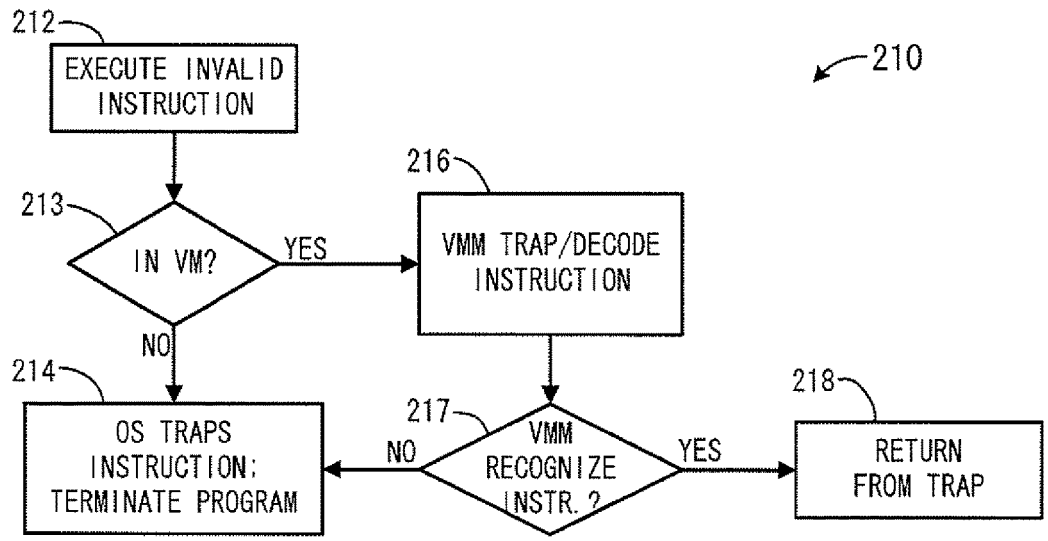
FIG. 7 shows a simplified flow chart illustrating by way of example a method of identifying execution of an application program within a defined type of virtual machine.

FIG. 7 shows a flowchart 210 illustrating by way of example a technique for determining virtual machine compatibility involving execution of a nominally invalid instruction 212. In operation 212, licensing module 72 (or application 62 if the licensing functionality is incorporated into application 62) executes an invalid instruction. If the instruction is not executed within a virtual machine as indicated by decision block 213, then the procedure flows to operation 214, wherein a conventional operating system trap for an invalid processor instruction is taken in operation, resulting in termination of licensing module 72 or application 62 by the underlying operating system. Where the licensing module is executing within a virtual machine, the procedure flows to operation 216 wherein execution of an invalid instruction may result in an invalid instruction execution trap to the system level hardware, which in this case would be part of virtualization software 115 (FIG. 2) In one embodiment, the trapped invalid instruction will be decoded in operation 216 to determine if the trapped instruction is a specific invalid instruction predefined for use by the virtualization software, e.g., a virtual machine monitor, and that can be accordingly used as a test for virtual machine compatibility. For example, the virtualization software may implement the instruction particularly for the purpose of testing whether the program is executing within a VM. If the instruction is recognized, the procedure flows to operation 218 wherein the instruction may be functionally discarded and the virtual machine monitor returns to permit continued execution of licensing module 72. Conversely, where the invalid instruction is not recognized or the virtual machine is incompatible with licensing module 72, then the procedure flows to operation 214 wherein the invalid instruction trap is forwarded to the operating system 66, again resulting in termination of licensing module 72 or application 62.

Referring again to FIG. 6, operation 184 determines whether the licensing module (or application) is executing within a VM, e.g., as described above with reference to FIG. 7. If the licensing module is not operating within a VM, then the procedure flows to operation 186 wherein the application is terminated as previously described. On the other hand, if the licensing module is executing within a VM, then the procedure flows to operation 188, wherein a query is issued through either a virtual dongle interface or a directly to the virtual policy enforcer 102 in order to authenticate application 62 and, as applicable, retrieve applicable licensing control information. Depending on the particular implementation, operations 190, 192, 194 and 196 encircled by box 189 may be performed by one or more of a virtual dongle, licensing module 72, or virtual policy enforcer 102. In one embodiment, operations in box 189 are performed exclusively by a virtual dongle. For increased security, an application identifier and license key may be required to be presented to virtual dongle 188. For example, the application identifier may identify the application properties set 174 (FIG. 5) defined for the specific application 62. The license key may be presented for conventional use in authenticating the application 62 against license file 116, 116' and retrieve associated license control information from the identified application properties set 174.

Figure 8:
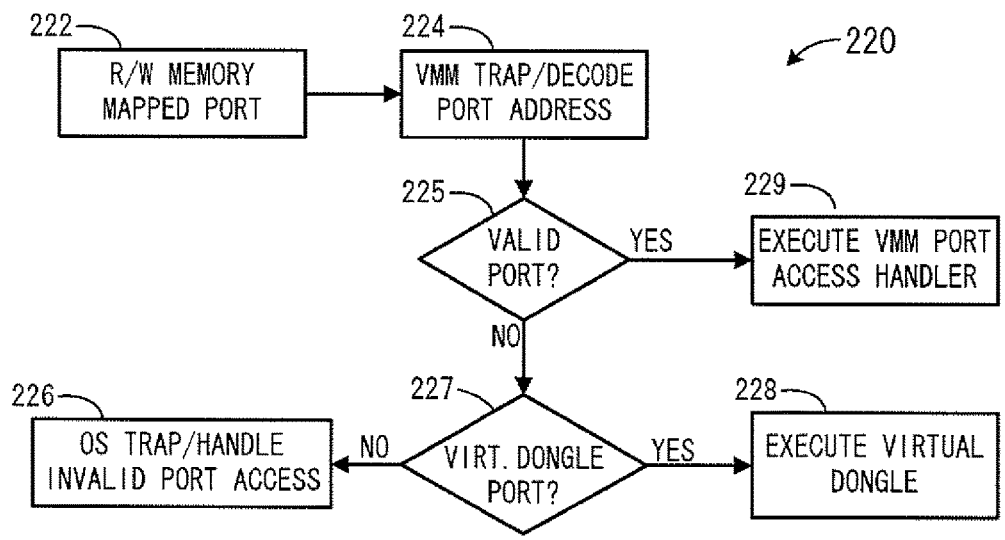
FIG. 8 shows a simplified flow chart illustrating by way of example a method of establishing a virtual dongle-based communications channel within virtual machines.

FIG. 8 shows a flowchart 220 illustrating by way of example a procedure for communicating with a virtual dongle attached to a virtual port that is invalid from the standpoint of the virtual machine. Posting of the license key and application identifier query, including transfer of associated data to the virtual dongle 188 or virtual policy enforcer 102, may be performed through execution of one or more memory read/write operations directed to one or more pre-defined memory mapped I/O port addresses. In operation 222, reads and writes, may be issued, e.g., using standard IN and OUT instructions to a predetermined port assigned to the virtual dongle or virtual policy enforcer. In operation 224, the virtual machine monitor (or another component of the virtualization software) traps the resulting invalid access exception will be trapped 224 by the virtual machine monitor or other component of the virtualization software. In operation 225, the VMM or other component of the virtualization software determines whether the memory accesses to the virtual memory are mapped I/O ports of the virtual devices 138 known to the guest operating system 66. If so, the procedure flows to operation 229, wherein the virtual machine monitor executes the corresponding virtual peripheral hardware handler.

For memory accesses directed to addresses that are not recognized by the virtual machine monitor, the procedure flows to operation 227 to determine if the memory access is directed to a pre-define address outside of the address space allocated to the guest operating system 66 that is associated with the virtual dongle port. If not, then procedure flows to operation 226 wherein an invalid access exception is returned by the virtual machine monitor to guest operating system 66 for handling in a conventional manner.

If the invalid port is associated with the virtual dongle then the procedure flows to operation 228 wherein the virtual dongle is executed. As previously mentioned, accesses intended for virtual dongle 188 may be directed to a pre-defined address outside of the address space allocated to the guest operating system 66. On trap of these memory access exceptions, the virtual machine monitor may execute virtual dongle 188 to process the data transfer. Thus, for a license authentication query, initiated by application 62, each read and write operation of the ensuing cryptographic challenge/response transaction will be routed through virtual dongle 188 by the virtual machine monitor.

Returning to FIG. 6, for the specific case of a request to retrieve license information, the query is responded to as shown in operations designated by box 189, wherein the virtual dongle 188 (or other component), working in conjunction with the virtual policy enforcer layer 102, reads the policy control files 100 (FIG. 2) in operation 190 to retrieve relevant access control and restriction policies. Then, in operation 192, virtual dongle 188 (or other component) evaluates the policies to further locate and retrieve the applicable license file 116, 116'. Then in operation 194, the application identifier and application key are authenticated against the license file key data. The procedure then flows to decision block 196. On authentication failure, the procedure flows to operation 186 wherein the execution of the application 62 may be terminated 186. Alternatively, the application may be placed in a "limp" or "reduced usability" mode pending a license purchase or other remediation, or the initiation of a trial period may begin (be maintained or ended), wherein the trial period allows full access to application features for testing purposes.

Where authentication is successful in operation 194, the procedure flows from decision block 196 to operation 198, wherein the license information may be further examined to determine the features and functions that will be identified through the license module 72 to the application 62 as licensed and thereby enabled for use in the further execution of the application 62. Alternately, or in addition, subsequent queries for license control information, dynamically initiated by the application 62, can be similarly trapped and routed through the virtual dongle 188, subject to policy qualification as performed by the virtual policy enforcer layer 102, to retrieve enabled features and functions license information. In either case, the license module 72 then returns to allow initialization of the application program 62 in operation 200 to complete the procedure.

Figure 9:
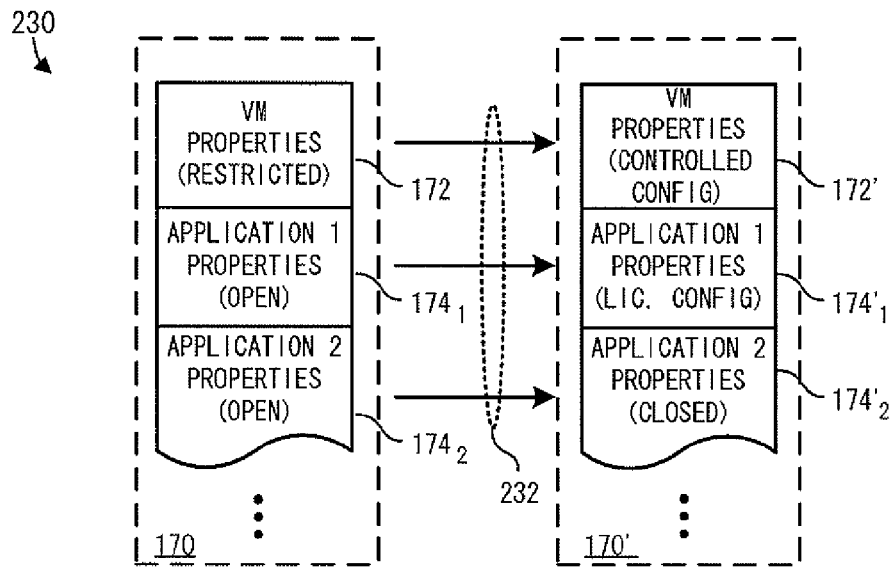
FIG. 9 shows a block diagram illustrating coordinated modification of virtual machine and application properties.

Referring to FIG. 9, the sets of virtual machine and application properties stored by the property files 170 are constructed and maintained as a coordinated set of properties. In particular, virtual machine properties set 172 may be established and adjusted to augment control over the licensed use of application programs as defined by application properties 174. For example, use of a virtual machine package 130 described above with reference to FIG. 3 may enhance security and control for distributing application programs 62 initially for unrestricted demonstration or test use and subsequently selectively restricted use based on acquired licenses. In this case, the virtual machine properties 172 may be initially defined in a highly restricted configuration while most, if not all functions and features of the application programs 62 are enabled through the settings of the application properties $174_{1-N}$.

In this restricted virtual machine configuration, guest operating system 66 and all hosted application programs 62 are functionally constrained to basic user interaction and further exclusively limited to accessing just the virtual disk image 94. The restricted properties 172 configuration of the virtual machine 12 is defined to preclude the transfer of data out of the virtual machine 64, including copying of data between the virtual disk image 94 and disk storage 124 or other storage devices. The restricted configuration further precludes copying in of any programs that could be used to tamper with the applications 62 or to copy out an application program 62 for any purpose. Other restricted configuration virtual machine properties 172 are concurrently defined to enable only essential virtual external I/O connections. Keyboard and display interaction with the applications 62 may be enabled, while virtual network connections and others external I/O connections, such as printer interfaces, may be disabled. Without the ability to import or export or data, other what may be typed in or viewed on the user display, the application programs 62 have little practical utility other than for evaluation use. Therefore, without modifying application 62 in any way, its use may nevertheless be restricted by disabling I/O functionality of the containing VM.

Additionally, the restricted configuration of virtual machine properties 172 defines storage and treatment of the host identifier value used in authenticating the virtual machine as described above with reference to FIG. 4. A virtual machine property is defined to store the host identifier value as a blank or otherwise specified default value. When this default value is read and evaluated by virtual policy enforcer layer 102, virtual machine 64 will be permitted to execute on any host platform. Thus, although there may be no restriction on use of the most advanced features and functions of applications 62, the identity of hosts permitted to execute virtual machine 64, or even on the ability to make and execute copies of virtual machine 64, the restricted configuration of virtual machine 64, including all restricted configuration copies, ensures limitation of the hosted applications 62 to no more than demonstration and test use.

Returning to FIG. 9, the restricted configuration 170 of virtual machine 64 may be altered by modifying application property files 170, including license file 116, 116' (FIG. 2) as represented in FIG. 9 by arrows 232. In one embodiment, for example, property files 170' may be functionally created through by applying a patch update applied to the virtual machine folder 96. Such a patch update may be received as a consequence of a conventional license rights acquisition transaction wherein license rights to use a specific set of application features on a specific host platform is acquired. Virtual machine properties 172' preferably replace the default host identifier with an identifier that will only authenticate against the specific host identifier of the licensed host platform 114. Revisions to the virtual machine properties 172' limiting the available set of virtual peripheral devices 136, 138 are made to enable use of the peripheral devices 136, 138 to a scope commensurate with the licensed rights. Establishing the host identifier property functionally locks execution of the virtual machine 64 to the one host platform 114. Instances of the virtual machine 12, as executed from copies of the virtual machine package 38 having the patch update applied, will not complete initialization on unlicensed host platforms due to a failure to authenticate 160.

The patch update may also modify one or more of application properties $174'_{1-N}$ to allow use consistent with the acquired license rights. Thus, for example, the application property set $174'_1$ may be updated to allow a licensed scope of use for the corresponding application or suite of applications 62, while the remaining application property sets $174'_{2-N}$ may be marked closed to simply preclude execution for any purpose. License files 116, 116' (FIG. 2) may be updated integrally with the application property set $174'_1$. Application property set $174'_1$ is thus effective in locking the corresponding licensed instance of the application or suite of applications 62 to the virtual machine 64 and, in combination with the virtual machine properties 172', further to a specific host platform 114. Concurrently, unlicensed use of other applications 62, controlled by the application property sets $174'_2$, would be prohibited.

Figure 10:
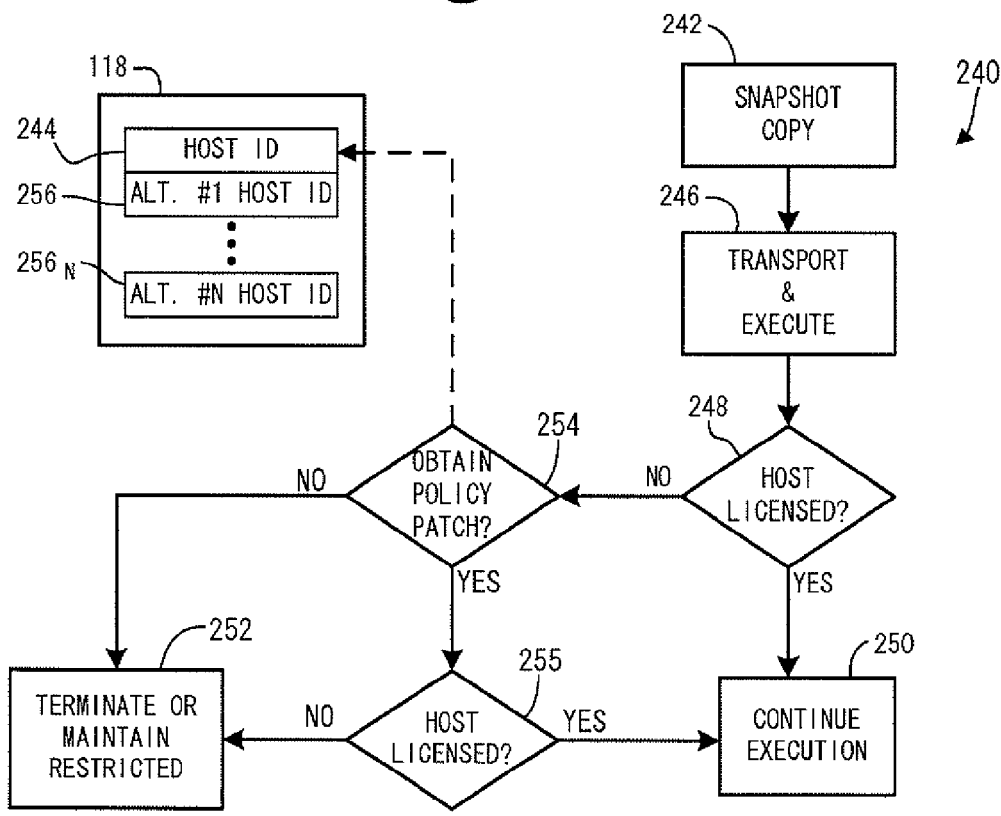
FIG. 10 shows a flow chart illustrating by way of example a method of controlling the allowed snapshot creation of authorized virtual machine package copies.

FIG. 10 shows a flowchart 240 illustrating by way of example, a preferred process for managing copy control list 118 (shown in FIG. 2), as maintained effectively as part of the virtual machine property set 172. In operation 242, a snapshot copy of the virtual machine is generated, which may result in production of virtual machine package 132, described above with reference to FIG. 3. In one embodiment, the snapshot may be administratively requested through the virtual machine manager 106 (also shown in FIG. 2). The generation of the virtual machine package 132 may be controlled by the virtual policy enforcer 102 subject to evaluation of the policy control files 100.

In operation 246, the user transports the snapshot created in operation 242 to a different host platform 114. For example, the user may copy VM package 132 and transmit the copy to a different host platform 114 over a network connection. In operation 248, the virtualization software 115, when initializing VM 64 on the different host platform 114, compares the host identifier value for the different host platform 114 with host value 244 stored as part of or in conjunction with the copy control list 118. If the values match, then the host is considered to be licensed for execution on different host platform 114 and the procedure flows to operation 250 wherein execution of VM 64 is permitted to proceed. On the other hand, if the host identifier values do not match, then the procedure flows to operation 254 to determine if a policy patch is available. If not, then the procedure flows to operation 252 wherein execution of the virtual machine 64 is either terminated or continues in a restricted mode. If a policy patch is available in operation 254, then the policy patch is obtained and applied to copy control list 118, therefore modifying host value 244. Thereafter, the procedure flows to operation 255 wherein the procedure described above for operation 248 is repeated to determine if the patched virtual machine is now properly licensed for the different host platform 114. If the authentication fails, then the procedure flows to operation 252 wherein the virtual machine is terminated or restricted. If, in operation 255, the authentication succeeds, then the procedure flows to operation 250 wherein the virtual machine is permitted to continue executing.

In an alternate embodiment, copy control list 118 may store of some number of alternate host values $256_{1-N}$. In authenticating the virtual machine 64 for a host platform 114, each of the host values 244, $256_{1-N}$ is preferably checked as part of the authentication 160 step. The host values 244, $256_{1-N}$ thus defines a pool of host platforms 114 within which copies of the virtual machine 12 can be freely transferred and executed. Transfers can be performed as needed to accommodate load sharing, redundancy, maintenance, and other similar goals. For this embodiment, the host values 244, 256$_{1-N}$ can be provided as part of the update patch providing for the initial licensing of the virtual machine 12 or, potentially, incrementally relying on the license server generating patch updates to maintain a unique identification of the allowed host platforms 114 in a particular pool of platforms.

Thus, a system and methods for providing for enabling software programs, most commonly user application programs, to appropriately access license data fully consistent with execution within a virtual machine based system has been described. In view of the above description of the preferred embodiments of the present invention, many modifications and variations of the disclosed embodiments will be readily appreciated by those of skill in the art. For example, the mass storage devices utilized may be local to the host platform or accessed remotely through a communications network. Further, the virtual machine policy control files 100 may be accessed indirectly through the virtual machine manager 106 or another policy management server, allowing the policy control files 100 of multiple virtual machines 12 to be centrally managed and updated in a coordinated and securely controlled manner. It is therefore to be understood that, within the scope of the appended claims, the invention may be practiced otherwise than as specifically described above.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

The invention claimed is:

1. A computer system comprising:
    system hardware, including one or more physical processors, one or more physical memories, and one or more physical mass-storage devices;
    a virtualization layer, including multiple virtual device emulators and a virtual policy enforcer, that executes on one or more of the one or more physical processors; and
    one or more virtual machines, each virtual machine authorized to execute in the computer system by policy control data stored in one or more of the one or more physical mass-storage devices accessed by the virtual policy enforcer, each virtual machine including
        a virtual hardware platform implemented by one or more of the multiple device emulators within the virtualization layer, a guest operating system that provides an application-program execution environment, and an application program that executes within the application-program execution environment and that is licensed to execute by a license module that accesses license control information stored in one or more of the one or more physical mass-storage devices, wherein the virtual policy enforcer controls access to the policy control data, the policy control data encrypted and stored within one or more policy control files on one or more of the one or more physical mass-storage devices, the policy control data decrypted by a cipher function library included in the virtualization layer when the virtual policy enforcer accesses one or more of the one or more policy control files.

2. The computer system of claim 1 wherein, when the virtualization layer loads a virtual machine on the system hardware for initialization and execution, virtual devices within the virtual hardware platform of the virtual machine are functionally disabled by a default locked configuration that precludes operation of the application program or the guest operating system within the virtual machine.

3. The computer system of claim 2 wherein, once the virtual machine is initialized to permit interaction with the virtual policy enforcer, a virtual machine monitor queries the virtual policy enforcer to determine whether continued execution of the virtual machine is permitted within the computer system.

4. The computer system of claim 3 wherein, in response to the virtual-machine-monitor query, the virtual policy enforcer:

accesses one or more of the one or more policy control files;

derives a platform identifier from one or more components of the system hardware; and uses a license-value portion of policy control data extracted from the one or more policy control files and the derived platform identifier to cryptographically authenticate execution of the virtual machine within the computer system.

5. The computer system of claim 4 wherein, when the virtual policy enforcer successfully authenticates execution of the virtual machine within the computer system, the virtual policy enforcer:

accesses one or more of the one or more policy control files; and uses a set of virtual machine properties extracted from the one or more policy control files along with virtual machine configuration files to configure the virtual machine for operation.

6. The computer system of claim 4 wherein, when the virtual policy enforcer fails to successfully authenticate execution of the virtual machine within the computer system, the virtualization layer terminates execution of the virtual machine.

7. The computer system of claim 1 wherein, following loading of an application program of a virtual machine for execution, the licensing module of the virtual machine determines whether or not the application program has been loaded into a virtual hardware platform by executing an invalid instruction that, when attempted to be executed by an operating system not executing as a guest operating system within a virtual machine, results in termination of execution of one or both of the application program and licensing module and that, when attempted to be executed by a guest operating system executing within a virtual machine, is trapped and recognized by the virtualization layer, the virtualization layer then permitting continued execution of the application program and licensing module.

8. The computer system of claim 1 wherein, following loading of the application program of the virtual machine and determination that the application program is loaded into the virtual hardware platform of the virtual machine by the licensing module, the licensing module issues a query that results in access, by the virtual policy enforcer, of a properties set for the application program stored in one or more of the one or more physical mass-storage devices.

9. The computer system of claim 8 wherein the licensing module issues the query to the virtual policy enforcer.

10. The computer system of claim 8 wherein the licensing module issues the query to a virtual dongle, the query including an application identifier and a license key.

11. The computer system of claim 8 wherein the licensing module issues the query by executing of one or more memory read/write operations directed to one or more pre-defined memory-mapped I/O port addresses.

12. The computer system of claim 8 wherein the virtual policy enforcer uses an application identifier and an application key and the properties set for the application program to determine whether or not the application program is authorized to execute within the virtual machine, allowing the application program to continue executing when the application program is authorized to execute within the virtual machine and otherwise terminating execution of the application program.

13. The computer system of claim 11 wherein, when the application program is authorized to execute within the virtual machine, license information extracted from a license file stored on one or more of the one or more physical mass-storage devices is used to configure features and functions of the application program for execution.

* * * * *